United States Patent [19]

Smith

[11] Patent Number: 5,657,887

[45] Date of Patent: Aug. 19, 1997

[54] STORAGE/SHIPPING RACK FOR FENCE SECTION

[76] Inventor: Lee Roy Smith, 110 Two Rivers Ct., Nashville, Tenn. 37214

[21] Appl. No.: 526,549

[22] Filed: Sep. 12, 1995

[51] Int. Cl.$^6$ .......................... A47B 43/00; A47B 47/00; A47B 57/00
[52] U.S. Cl. .................... 211/189; 211/182; 108/55.1
[58] Field of Search .................. 108/51.1, 55.1, 108/56.1; 211/189, 182, 195

[56] References Cited

U.S. PATENT DOCUMENTS

| | | | |
|---|---|---|---|
| 1,747,026 | 2/1930 | Phillips | 211/182 X |
| 2,471,693 | 5/1949 | Lilienfeld | 108/55.1 |
| 2,669,373 | 2/1954 | Coit | 108/55.1 X |
| 2,707,573 | 5/1955 | Balwics . | |
| 3,101,128 | 8/1963 | Dane | 182/222 |
| 3,149,586 | 9/1964 | Kemp et al. | 108/51.1 |
| 3,168,060 | 2/1965 | Farley | 108/55.1 X |
| 3,193,093 | 7/1965 | Hansen . | |
| 3,277,848 | 10/1966 | Dunge . | |
| 3,946,876 | 3/1976 | Jay . | |
| 4,216,933 | 8/1980 | Cramer | 248/188.5 |
| 4,230,051 | 10/1980 | Mays | 108/55.1 |
| 4,342,268 | 8/1982 | Grava | 108/55.1 |
| 4,349,213 | 9/1982 | Hirsch | 211/182 X |
| 4,754,711 | 7/1988 | Solomon | 211/182 X |
| 5,228,821 | 7/1993 | Gleffe et al. | 211/195 X |
| 5,348,149 | 9/1994 | McCarthy | 206/326 |

FOREIGN PATENT DOCUMENTS

| | | | |
|---|---|---|---|
| 3436459 | 4/1986 | Germany | 108/51.1 |
| 332368 | 10/1958 | Sweden | 211/189 |

Primary Examiner—Leslie A. Braun
Assistant Examiner—Stephen S. Wentsler
Attorney, Agent, or Firm—Waddey & Patterson; I. C. Waddey, Jr.

[57] ABSTRACT

A shipping and storage rack for modular sections of mesh wire fencing, including a support frame and a resting frame held in spaced relationship by spacers forming a radial slot about the perimeter of the racks for receipt of the tines of a forklift truck. The support frame and resting frame are preferably rectangular in shape and the support frame has cross bars and longitudinal bars to carry the modular sections of fences and to act as a resting lever for the tines of the forklift truck. Extending perpendicularly upwardly from the support frame are retaining stubs which hold the bottom portion of the modular sections of fencing in place. End frames are attached to the support frame to hold the fence sections in place on the rack. Retaining bars extend longitudinally on each side of the rack and are removably mounted on sleeves attached to the end frames. By this structure, the sections of fencing can be loaded onto the frame from either side and held in place by the retaining bars during storage, movement within a storage location and shipment to a construction site. The rack is of an open construction of steel pipe to provide substantial strength for the load that is being carried at a minimum weight.

5 Claims, 2 Drawing Sheets

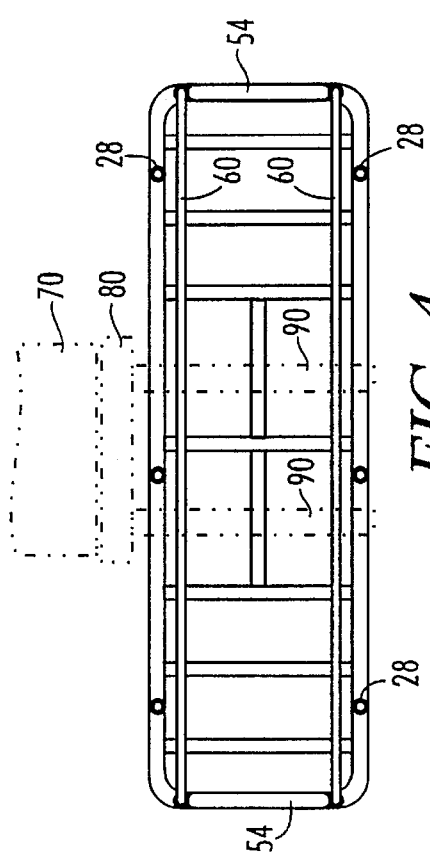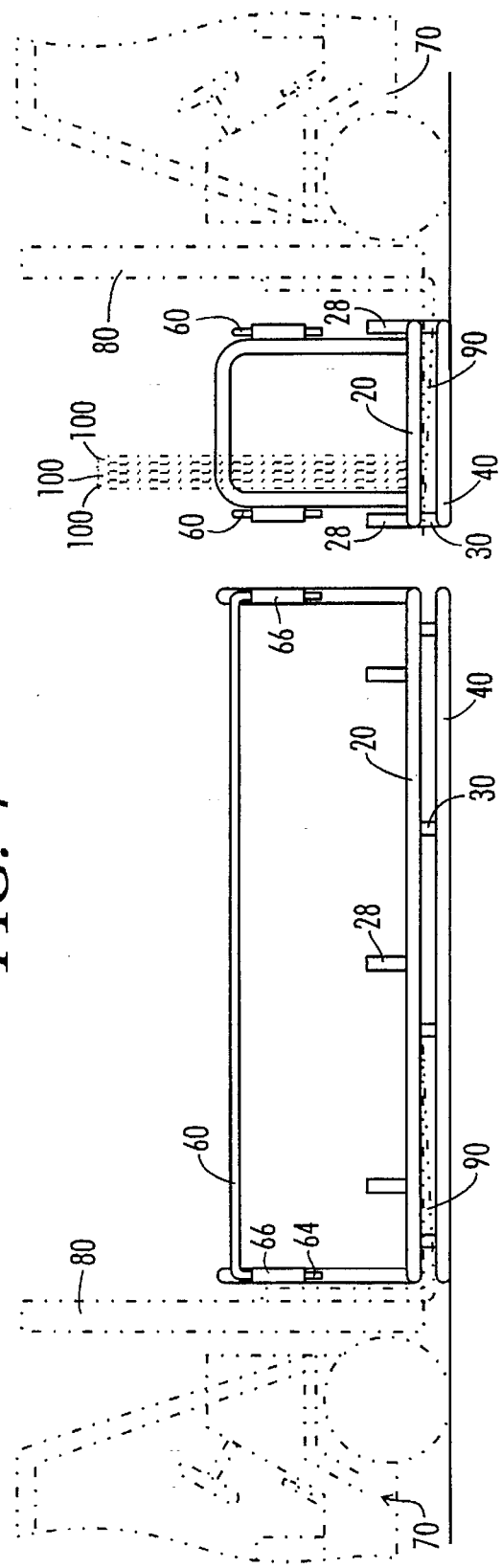

STORAGE/SHIPPING RACK FOR FENCE SECTION

APPLICATION FOR UNITED STATES LETTERS PATENT

Be it known that I, Lee Roy Smith, a citizen of the United States, residing at 110 Two Rivers Court, Nashville, Tenn. 37214, have invented a new and useful "Storage/Shipping Rack for Fence Sections".

BACKGROUND OF THE INVENTION

The present invention relates generally to storage and shipping racks and more particularly to a storage and shipping rack designed for use in conjunction with modular sections of chain link fencing.

It will be appreciated by those skilled in the art that wire mesh fencing has achieved substantial commercial success in both residential and commercial applications as well as uses in conjunction with public and private safety barrier systems and the like. Because of the success of wire mesh fencing, generally referred to as chain link fence, the product is sold and distributed in mass quantities throughout the world. The substantial market for chain link fencing makes the storage, movement and shipment of such fencing a significant cost factor in the selling price, particularly since the fencing itself is bulky and cumbersome to handle.

Historically, chain link fencing has been sold and distributed in rolls. Specifically, the fencing itself has been rolled about a spindle, much the same as carpet and similar materials have been rolled for shipment. Large quantities of chain link fencing would be delivered to the job cite in this manner for installation. Metal posts are generally shipped as a part of the same shipping process, or separately, and posts are installed and the fence assembled by mounting it on the posts that have been installed in the ground.

More recently, chain link fencing has been manufactured in modular sections. These sections are constructed generally using a rectangular frame of steel pipe or the like with mesh wire stretched over the frame and attached to the frame at various points about its perimeter. By this arrangement, the multiple modular sections can be connected in an end-to-end relationship to create a boundary or enclosure of the desired configuration. The section will generally be strapped to posts that have been driven in the ground to hold the sections vertically in position.

The construction of wire fencing in modular sections allows much of the stretching and other tedious work associated with chain link fencing to be done at a manufacturing facility rather than in the field. Use of modular fencing has become particularly popular in applications which require the fencing to be moved periodically because the modular fencing can be disassembled in modules and moved to a different configuration or another location and reassembled without having to re-stretch the wire mesh over new fence posts; thus eliminating the substantial cost associated with that exercise.

The development of modular sections of chain link fencing has, however, resulted in new and different problems associated with the storage and shipment of the product. Specifically, the traditional method of shipping chain link fencing in rolls is no longer possible since the modular sections are preassembled into panels that can be in the range of 3–10 feet long and 4–8 feet high.

Applicant's invention is designed specifically to facilitate the storage, shipment and delivery of modular sections of chain link fencing. Storage and shipping racks are not, per se, new. For example, a shipping rack for glass panels was the subject matter of a patent issued to Hansen on Jul. 6, 1965, U.S. Pat. No. 3,193,093, and a shipping rack for folding chain was designed and patented by McCarthy in U.S. Pat. No. 5,348,149. However, the shipping racks disclosed in these patents and other prior art shipping and storage racks are not readily adaptable to the problems associated with shipment of modular sections of chain link fencing. The size and bulk of modular sections of chain link fencing require a rack of extra strength and stability, one which will adequately hold vertically stacked modular sections of chain link fencing within the rack and prevent the sections from slipping off of the base of the rack, one that will allow easy access for loading and unloading modular sections of chain link fencing onto and off of the rack, and one that can be moved, stored, loaded and unloaded through the use of a conventional fork lift truck from any side and in any direction. Such a rack and storage system is presently lacking in the prior art.

SUMMARY OF THE INVENTION

My invention is a shipping and storage rack for modular sections of mesh wire fencing. The structure includes a support frame and a resting frame held in spaced relationship by spacers forming a radial slot about the perimeter of the racks for receipt of the tines of a forklift truck. The support frame and resting frame are preferably rectangular in shape and the support frame has cross bars and longitudinal bars to carry the modular sections of fences and to act as a resting lever for the tines of the forklift truck. Extending perpendicularly upwardly from the support frame are retaining stubs which hold the bottom portion of the modular sections of fencing in place. End frames are attached to the support frame to hold the fence sections in place on the rack. Retaining bars extend longitudinally on each side of the rack and are removably mounted on sleeves attached to the end frames. By this structure, the sections of fencing can be loaded onto the frame from either side and held in place by the retaining bars during storage, movement within a storage location and shipment to a construction cite. The rack is of an open construction of steel pipe to provide substantial strength for the load that is being carried at a minimum weight.

BRIEF DESCRIPTION OF THE DRAWINGS

FIG. 2 is a side view of the storage/shipping rack of my invention.

FIG. 3 is an end view of the storage/shipping rack of my invention.

FIG. 4 is a top view of the storage/shipping rack of my invention.

DESCRIPTION OF THE PREFERRED EMBODIMENT

Figure 1:
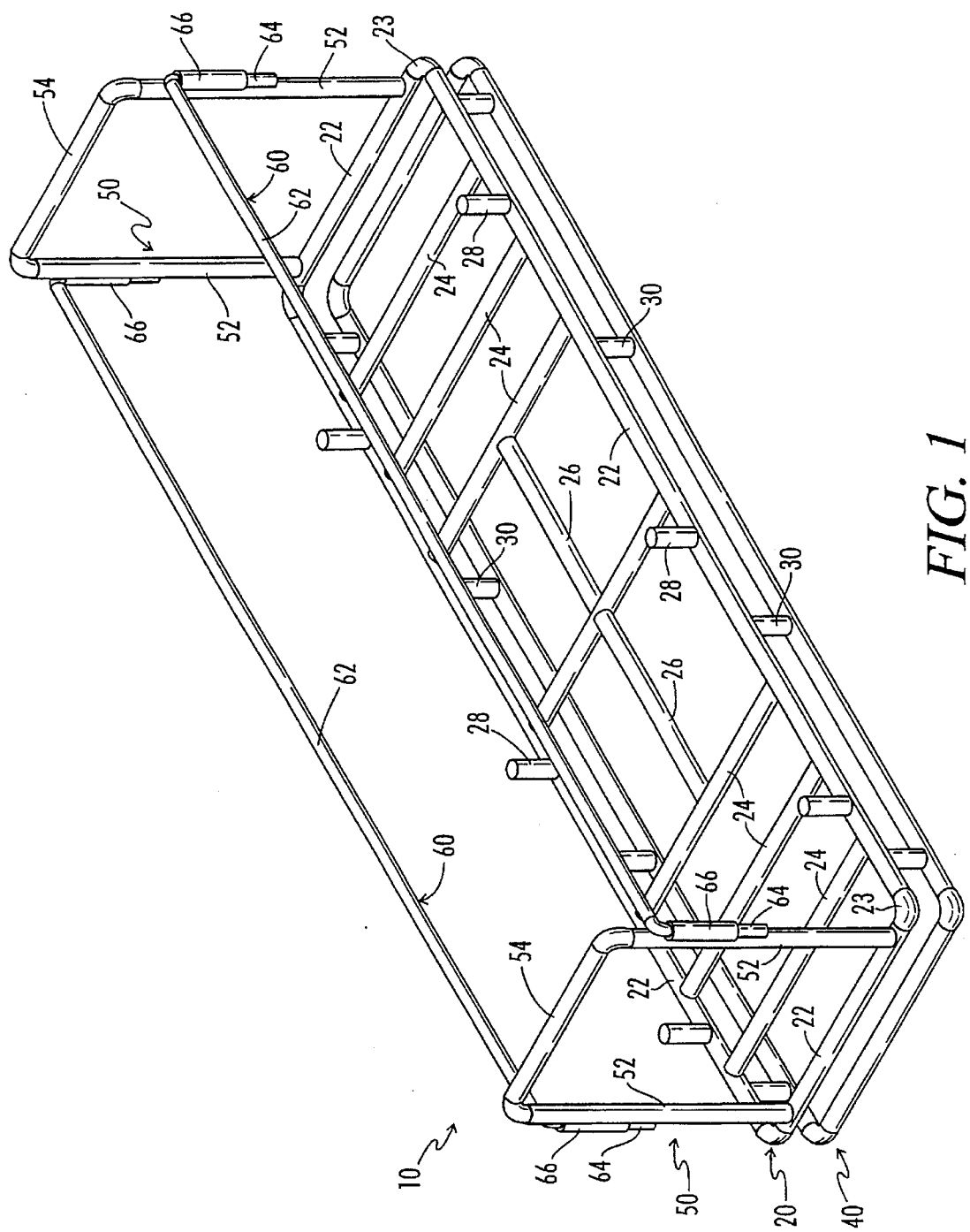
FIG. 1 is a perspective view of the storage/shipping rack of my invention.

My invention will be best understood by a review of the description of the preferred embodiment taken in conjunction with FIGS. 1–4 of the accompanying drawings that illustrate the preferred embodiment of the invention.

Referring to FIG. 1, the modular fence section storage/shipping rack of my invention is illustrated. The storage/shipping rack 10 has as its primary components a rectangular support frame 20 mounted in spaced relationship via spacers 30 on resting frame 40. Extending vertically upwardly from opposing ends of the support frame 20 are end frames 50. Retaining stubs 28 extend vertically upwardly from the sides of the rectangular support frame to hold fence sections in place. Retaining bars 60 are removably attached to side posts of end frames 50 so that modular sections of chain link fencing can be loaded from either side of the rack 10 and the retaining bars 60 can be replaced once the rack is loaded to hold the sections of fence in place.

In the preferred embodiment of the present invention, the support frame 20 is rectangular in shape and is made of steel pipe or similar material. Sections of pipe 22 can be connected by conventional elbows 23, or they may be welded directly to each other at their extremities.

As additional support for the rectangular perimeter of the support frame 20, cross support bars 24 are welded along the length of the longer side of the rectangular support frame. Longitudinal support bars 26 are welded or otherwise connected to the intermediate cross support bars 24 to provide a leverage point for the tips of the tines of a forklift truck when the rack is moved by a forklift truck from the side.

Vertical retaining stubs 28 project several inches upwardly from the sides of the support frame 20 in order to keep modular sections of chain link fence, when loaded on the rack, from slipping off of the rack. The stubs are limited in height, however, to make it convenient to load sections of fence over the stubs from the side of the rack.

Resting frame 40 is connected to the support frame 20 by spacers 30 extending about the perimeter of the rectangular support frame. The resting frame 40 is spaced a few inches from the support frame 20 by the spacers 30 so that the tines of a forklift truck can easily fit beneath the support frame 20 to make the movement of the rack convenient through use of such equipment. As can be seen from the illustration in FIG. 1, the tines of a forklift truck can be inserted beneath the rectangular support frame 20 from either side or either end, all which makes the handling of sections of fence stored on the rack 10 as convenient as is reasonably possible.

At each end of the rectangular support frame 20 are end frames 50 constructed of vertical end posts 52 and a horizontal bar 54. The horizontal bar keeps the modular sections of the chain link fence within the rack and prevents them from sliding out of the rack on either end.

Attached to the outside of the vertical end posts 52 are sleeves 66. The sleeves 66 are generally cylindrical in shape and have an open center to receive depending arms 64 of rails 62. The rails 62 and the depending arms 64 constitute the retaining bars 60 that are removably attached to each side of the rack 10. By the use of this structure, the rack can be conveniently loaded from either side simply by removing the retaining bar 60 from the side of the rack where loading is to occur. Once the rack is loaded with the modular sections of chain link fence, the retaining bar 60 can be reattached to the rack by inserting the depending arm 64 in the sleeves 66.

FIGS. 2, 3 and 4 illustrate the convenience of the rack of the present invention. FIG. 2 illustrates the rack being lifted by a tow motor 70 which is shown in phantom lines in the drawings. The tow motor has a forklift type front end attachment 80 with horizontal tines 90 protruding from the forklift structure. The tines of the forklift device slip beneath the support frame 20 (and above the resting frame 40), and the rack, as filled with modular sections of chain link fence, can then be lifted for movement, loading, unloading and storage.

FIG. 3 illustrates a tow motor in position to move the rack by inserting the tines 90 of the tow motor 70 beneath the support frame 20 and above the resting frame 40 from the side. FIG. 3 also shows an end view including (in fantom lines 100) several of the modular sections of chain link fence loaded on the rack of the present invention. Further, as can be seen from FIGS. 2 and 3, the retaining bar 60 can be easily removed to allow loading and unloading of the modular sections of chain link fence from the rack 10.

FIG. 4 is a top view of the rack of the present invention showing once again the tow motor 70 having a forklift front end loading attachment 80 with a front end forklift loading device having tines 90 scooping up the rack 10 from the side. As indicated, the configuration of Applicant's rack allows the rack to be loaded from either side conveniently without having to lift the sections of fence over any substantial barrier height, to lock the sections of fence in place once they are loaded onto the rack and to conveniently move the rack from location to location through a conventional forklift truck.

Although there have been described particular embodiments of the present invention of a new and useful storage/shipping rack for fence sections, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A moving and storage rack for modular sections of chain link fencing including a rectangular support frame and a resting frame, means connecting said rectangular support frame to said resting frame in a spaced relationship, said rectangular support frame including cross support bars extending between opposing sides of said rectangular support frame, a pair of end frames connected to opposing ends of said rectangular support frame and extending vertically upwardly therefrom, nonrotatably fixed stubs connected to the sides of said rectangular support frame and extending vertically upwardly therefrom, said stubs having a height substantially less than the height of said end frames, first and second retaining means, the first retaining means extending between the pair of end frames on one side thereof and the second retaining means extending between the pair of end frames on the other side thereof and means for removably connecting said retaining means to said end frames whereby said retaining means can be conveniently connected to and removed from said end frames to create an open area for loading of said rack from the sides or the top of said rack with modular sections of chain link fencing from either side of said rack.

2. The moving and storage rack of claim 1 wherein the resting frame is rectangular and has a shape substantially equivalent to the shape of the support frame.

3. The moving and storage rack of claim 1 further including longitudinal support bars connected to and extending between said cross support bars.

4. The moving and storage rack of claim 1 wherein said connecting means include sleeves connected to said end frame with said retaining means including bars having depending arms shaped to fit within channels passing through said sleeves.

5. The moving and storage rack of claim 1 wherein said end frames include two posts arranged in spaced relationship and connected by a horizontal bar.

* * * * *